United States Patent Office 3,338,909
Patented Aug. 29, 1967

3,338,909
METHOD OF PREPARATION OF LOWER ALKOXY PIPERIDYL ACETONES BY HYDROGENATION WITH RHODIUM IN ACID CONDITIONS
Donald Frederic Barringer, Jr., and Gerald Berkelhammer, Trenton, N.J., assignors to American Cyanamid Company, Stamford, Conn., a corporation of Maine
No Drawing. Original application July 20, 1964, Ser. No. 383,993. Divided and this application Dec. 5, 1966, Ser. No. 598,895
3 Claims. (Cl. 260—293.2)

This application is a division of our copending application Ser. No. 383,993, filed July 20, 1964.

This invention relates to a novel process of preparing compounds which are highly useful in the synthesis of the quinazolone antimalarial compounds described in the Baker et al. Patent No. 2,694,711.

Preparation of these quinazolones and of the necessary intermediates are well known to the art and are also described in the Baker et al. Patents Nos. 2,796,417 and 2,775,597. In this latter patent there is described a process of reacting 2-methyl-3-pyridol with sodium methoxide and trimethylphenylammonium chloride at a temperature of from 120° C. to 180° C. in the presence of a non-acidic organic solvent to obtain 2-methyl-3-methoxypyridine. This compound is treated with phenyl lithium in the presence of ethyl or butyl ether to form 2-lithiomethyl-3-methoxypyridine, which is converted by reaction with acetaldehyde to 2-(beta-hydroxypropyl)-3-methoxypyridine which, in turn, is reduced to the piperidine by catalytic reduction in the presence of platinum oxide catalyst and generally, also, of acid. The formed piperidine may then be oxidized to (3-methoxy-2-piperidyl)-acetone by treatment with a strong oxidizing agent in the presence of acid. This intermediate may then be further processed by a series of known reactions to various antimalarial quinazolones.

Although the above-described process has been used successfully for the preparation of the intermediate (3-methoxy-2-piperidyl)-acetone, a compound readily converted in stepwise fashion to any of a number of quinazolones, unfortunately conversion of 2-methyl-3-methoxypyridine to (3-methoxy-2-piperidyl)-acetone by this route is time consuming, involves four individual steps and under optimum conditions provides only about a 40% yield of product. The proces of the instant invention, on the other hand, has the advantages of eliminating one process step, substantially reducing over-all reaction time and increasing the yield of product to about 60–65%.

The new process may be carried out by reacting the commercially available n-butyl lithium in hexane with 3-lower alkoxy-2-methylpyridine in an inert organic solvent such as absolute ether or dry hexane under an atmosphere of nitrogen, adding acetonitrile to the mixture and acidifying the same with aqueous acidic solution, treating the aqueous phase of this mixture with sodium hydroxide and methylene chloride, separating the aqueous phase from the organic layer and recovering the product (3-lower alkoxy-2-pyridyl)-acetone therefrom by vacuum distillation.

Briefly, the process of the present invention involves conversion of (3-lower alkoxy-2-pyridyl)-acetone to (3-lower alkoxy-2-piperidyl)-acetone by selective reduction of the pyridine ring with hydrogen over rhodium catalyst in an acid medium selected from the group consisting of aqueous hydrogen halide and organic acid-containing organic solvent, whereby the heterocyclic ring in the pyridyl compound is selectively reduced, and thereafter treating the resulting mixture with alkali.

Surprisingly, it has been discovered that other catalysts, such as platinum or palladium, will not selectively reduce the pyridine ring but, rather, reduce the carbonyl group or the carbonyl group together with the pyridine ring, producing a substance or mixture of substances which are useless for further conversion to the quinazolones.

The above reactions may be represented schematically as follows:

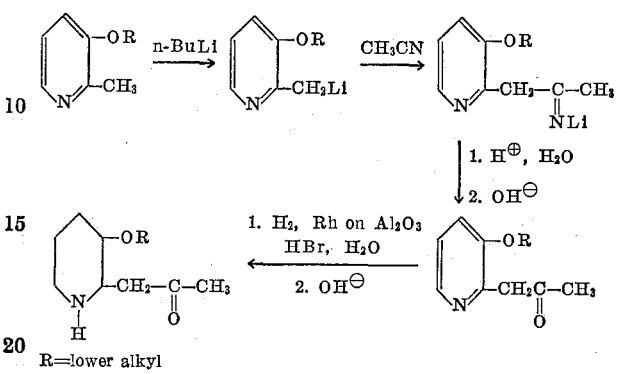

R=lower alkyl

The following conditions are also satisfactory for the hydrogenation: Rhodium on carbon can be substituted for rhodium on alumina. Methanolic hydrogen bromide can be used in place of aqueous hydrogen bromide, but more catalyst is required and the rate of hydrogenation is slower. Glacial acetic acid may be used, but the reduction is not as specific, and the product is contaminated with other reduction products. We may also use trifluoroacetic acid or similar organic acids such as oxalic, propionic, etc. in conjunction with an organic solvent such as tetrahydrofuran, dioxane, 2-methoxyethanol, etc.

The invention will be described in greater detail in conjunction with the following examples.

Example 1.—(3-methoxy-2-pyridyl)-acetone

The above-identified product is prepared by placing 275 ml. of 1.6 M n-butyl lithium in hexane (0.44 mole of n-butyl lithium) in a flask heated with a hot water bath and blowing a stream of nitrogen over the liquid to evaporate the solvent. After evaporation, one pound (455 grams, 643 ml.) of absolute ether is added, and the solution is cooled to 0°. While the liquid is stirred and maintained at 0–10° in a nitrogen atmosphere, 49.2 grams (0.40 mole) of 3-methoxy-2-methylpyridine is added dropwise. The mixture is warmed to 20° after completion of the addition and stirred for another hour. This results in a suspension of a yellow precipitate in a blood-red solution.

The mixture, still under nitrogen, is cooled to 0°, and 20.00 grams (0.488 mole) of acetonitrile is added dropwise with stirring. This mixture is kept cool an additional four hours and allowed to stand for 64 hours while warming to room temperature.

The mixture is cooled to 10–15° and 25 ml. of water added dropwise with stirring, followed by 250 ml. of 6 N hydrochloric acid. The layers are separated and the organic phase discarded. The aqueous layer is made strongly basic with sodium hydroxide pellets, and enough methylene chloride (~200 ml.) is added to make the organic layer the heavier. The layers are separated and the aqueous layer is extracted with two more 100 ml. portions of methylene chloride. The combined methylene chloride solution is dried over magnesium sulfate and evaporated under vacuum (bath temp. 30–40°) to yield an orange-brown oil.

The oily product is vacuum distilled through a Vigreux column. Approximately 45.13 grams (68.5%) of (3-methoxy-2-pyridyl)-acetone is obtained as a yellow oil, boiling point 86–92° at 0.10–0.12 mm. $n_D^{25}$ 1.5313.

*Example 2.—(3-methoxy-2-piperidyl)-acetone*

A solution of 5.00 grams of (3-methoxy-2-pyridyl) acetone in 45 ml. of deionized water is acidified by adding enough 48% hydrogen bromide to lower the pH to one. The solution is hydrogenated over 0.50 gram of 5% rhodium on alumina catalyst at 43–49 p.s.i. gauge and 57°. After six hours the reaction is stopped, and 97% of the theoretical amount of hydrogen is consumed.

The catalyst is filtered off and washed with water. The aqueous solution is made basic with sodium hydroxide pellets to pH=11 and extracted with three 25 ml. portions of methylene chloride. The extract is dried over magnesium sulfate and evaporated in vacuum (bath temp. 30–40°) to yield 4.71 grams (91%) of crude (3-methoxy-2-piperidyl)-acetone. This compound is heated for one hour on a steam bath under nitrogen and the product is purified by distillation; boiling point 65–75° at 0.22–0.24 mm. (60% recovery).

*Example 3.—(3-methoxy-2-pyridyl)-acetone*

A 1.6 M solution of n-butyl lithium in hexane (69 ml., 0.11 mole) is diluted with an equal volume of dry hexane. This solution is cooled to 2° and 12.3 grams (0.10 mole) of 3-methoxy-2-methylpyridine is added dropwise with stirring. After the addition is complete, the mixture is refluxed for 30–60 minutes. The mixture is cooled to 0° and 4.5 grams (0.11 mole) of acetonitrile is added dropwise with stirring. After the addition is complete, the cooling bath is removed and the mixture stirred for three hours. The mixture is then cooled again and acidified with 1.5 N sulfuric acid. The layers are separated, and the water layer is made basic with sodium hydroxide pellets and extracted with five 25 ml. portions of methylene chloride. The extract is dried and evaporated in vacuum to yield (3-methoxy-2-pyridyl)-acetone. This is heated on a steam bath for one hour under nitrogen and distilled in vacuum to yield a product identical to that obtained when ether is the solvent.

*Example 4.—(3-ethoxy-2-pyridyl)-acetone*

The compound is prepared in the same manner as (3-methoxy-2-pyridyl)-acetone described above except that 13.7 grams (0.10 mole) of 3-ethoxy-2-methylpyridine is substituted for the 3-methoxy-2-methylpyridine. The (3-ethoxy-2-pyridyl)-acetone is isolated as a yellow distillable oil.

*Example 5.—(3-ethoxy-2-piperidyl)-acetone*

A solution of 5.0 grams (0.028 mole) of (3-ethoxy-2-pyridyl)-acetone in 45 ml. of deionized water is acidified to pH=1 with 48% hydrobromic acid. This solution is hydrogenated at 3–4 atmospheres and 60–70° over 0.50 gram of 5% rhodium on alumina. After the hydrogen uptake stops, the catalyst is removed by filtration and the solution is made basic with sodium hydroxide pellets. The mixture is extracted with three 25 ml. portions of methylene chloride, and the extract is dried and evaporated in vacuum to yield (3-ethoxy-2-piperidyl)-acetone. This is heated for one hour on a steam bath under nitrogen and purified by vacuum distillation.

*Example 6.—(3-methoxy-2-piperidyl)-acetone*

A solution of 0.166 g. (0.0101 mole) of (3-methoxy-2-pyridyl)-acetone and 0.143 g. (0.0125 mole) of trifluoroacetic acid in 20 ml. of tetrahydrofuran is hydrogenated over 0.200 g. of 5% rhodium on carbon at 25° and one atmosphere of hydrogen. The hydrogenation rate is followed, and the reaction is interrupted when the rate begins to fall off. The catalyst is filtered out, and the solution is evaporated under vacuum. The residue is dissolved in water and made strongly basic with 10% sodium hydroxide. The product is extracted with three 10 ml. portions of methylene chloride. The extract is dried over magnesium sulfate and evaporated under vacuum to yield a yellow oil. This residue is dissolved in 50 ml. of an aqueous buffer solution of pH 7. The aqueous solution is extracted once with 10 ml. of methylene chloride, and then it is made strongly basic with 10% sodium hydroxide and the product is extracted with five 10 ml. portions of methylene chloride. The extract is dried over magnesium sulfate and evaporated under vacuum to yield a yellow oil. This oil is dissolved in 5 ml. of toluene, and the solution is heated under reflux for three to four hours. The toluene is removed by distillation at atmospheric pressure, and the residue distilled under vacuum to yield the product as a light yellow oil.

What is claimed is:

1. A process for preparing (3-lower alkoxy-2-piperidyl)-acetone which comprises treating (3-lower alkoxy-2-pyridyl)-acetone with hydrogen in the presence of a rhodium catalyst in an acid medium selected from the group consisting of aqueous hydrogen halide and organic acid-containing organic solvent, whereby the heterocyclic ring in the pyridyl compound is selectively reduced, and thereafter treating the resulting mixture with alkali.

2. A process according to claim 1 in which the (3-lower alkoxy-2-piperidyl)-acetone is (3-methoxy-2-piperidyl)-acetone.

3. A process according to claim 1 in which the (3-lower alkoxy-2-piperidyl)-acetone is (3-ethoxy-2-piperidyl)-acetone.

References Cited

UNITED STATES PATENTS

| 2,775,597 | 12/1956 | Baker | 260—294.75 |
| 2,878,254 | 3/1959 | Shapiro et al. | 260—293.2 |
| 2,937,179 | 5/1960 | Shapiro et al. | 260—293.2 |
| 3,051,715 | 8/1962 | Biel et al. | 260—293.2 |
| 3,056,797 | 11/1962 | Shapiro et al. | 260—293.2 |

FOREIGN PATENTS

| 904,117 | 8/1962 | Great Britain. |

OTHER REFERENCES

Buchi et al.: Helvetica Chim. Acta, vol. 45 (1962), pp. 729–737.

WALTER A. MODANCE, *Primary Examiner.*

A. D. SPEVACK, *Assistant Examiner.*